United States Patent

[11] 3,583,512

| | | |
|---|---|---|
| [72] | Inventor | Pierre A. Praddaude<br>Crepy-en-Valois, France |
| [21] | Appl. No. | 817,397 |
| [22] | Filed | Apr. 18, 1969 |
| [45] | Patented | June 8, 1971 |
| [73] | Assignee | Societe Anonyme Poclain<br>Le Plessis-Belleville, France |
| [32] | Priority | Apr. 19, 1968 |
| [33] | | France |
| [31] | | 148,738 |

[54] POWER TRANSMISSION
8 Claims, 5 Drawing Figs.

| | | |
|---|---|---|
| [52] | U.S. Cl. | 180/66,<br>60/53 |
| [51] | Int. Cl. | B60k 17/10 |
| [50] | Field of Search | 180/66,<br>6.48, 6.3; 60/53 |

[56] References Cited
UNITED STATES PATENTS

| | | | |
|---|---|---|---|
| 3,161,246 | 12/1964 | Meeker et al. | 180/66X |
| 3,303,901 | 2/1967 | Schou | 180/66X |
| 3,422,917 | 1/1969 | Guinot | 180/66 |

*Primary Examiner*—Benjamin Hersh
*Assistant Examiner*—Milton L. Smith
*Attorney*—Mason, Fenwick & Lawrence

ABSTRACT: An hydraulic power transmission for overcoming the problems involved in utilizing one set of power equipment for propelling a vehicle, such as is used in the building, civil engineering or material-handling industries, and for operating an hydraulic shovel or like actuator, and in particular overcoming the problems arising due to the differential effect of the wheels on opposite sides of the vehicles running a different speeds, and comprising two hydraulic pumps and two sets of wheels, each wheel having a hydraulic motor each set comprising a front wheel and a back wheel, the hydraulic motors of the wheels of any one set being supplied in parallel by one of the pumps, wherein at least two wheels of each set are disposed on two opposite sides of the vehicle.

Inventor
PIERRE A. PRADDAUDE
By
Mason, Fenwick & Lawrence
Attorneys

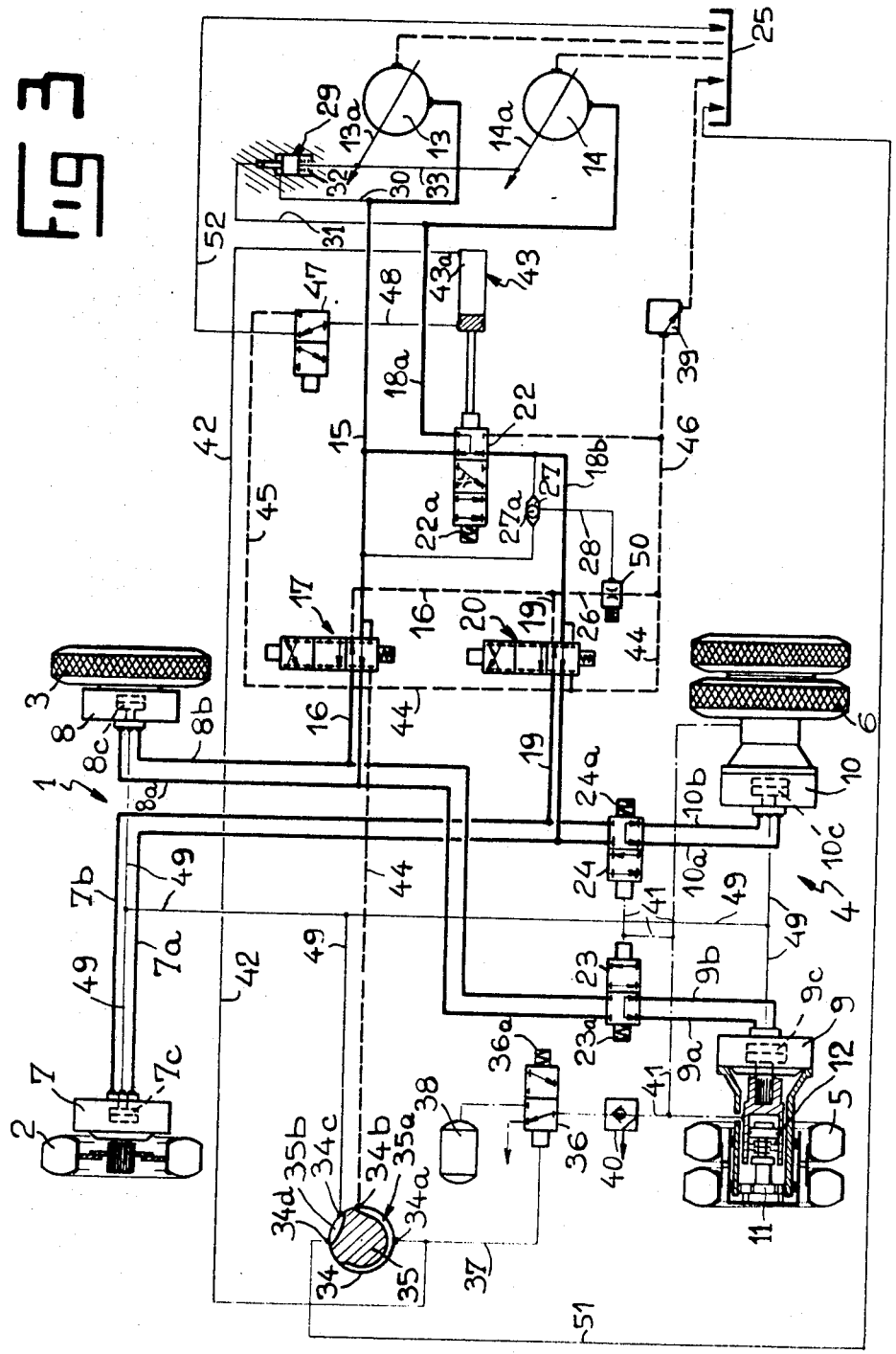

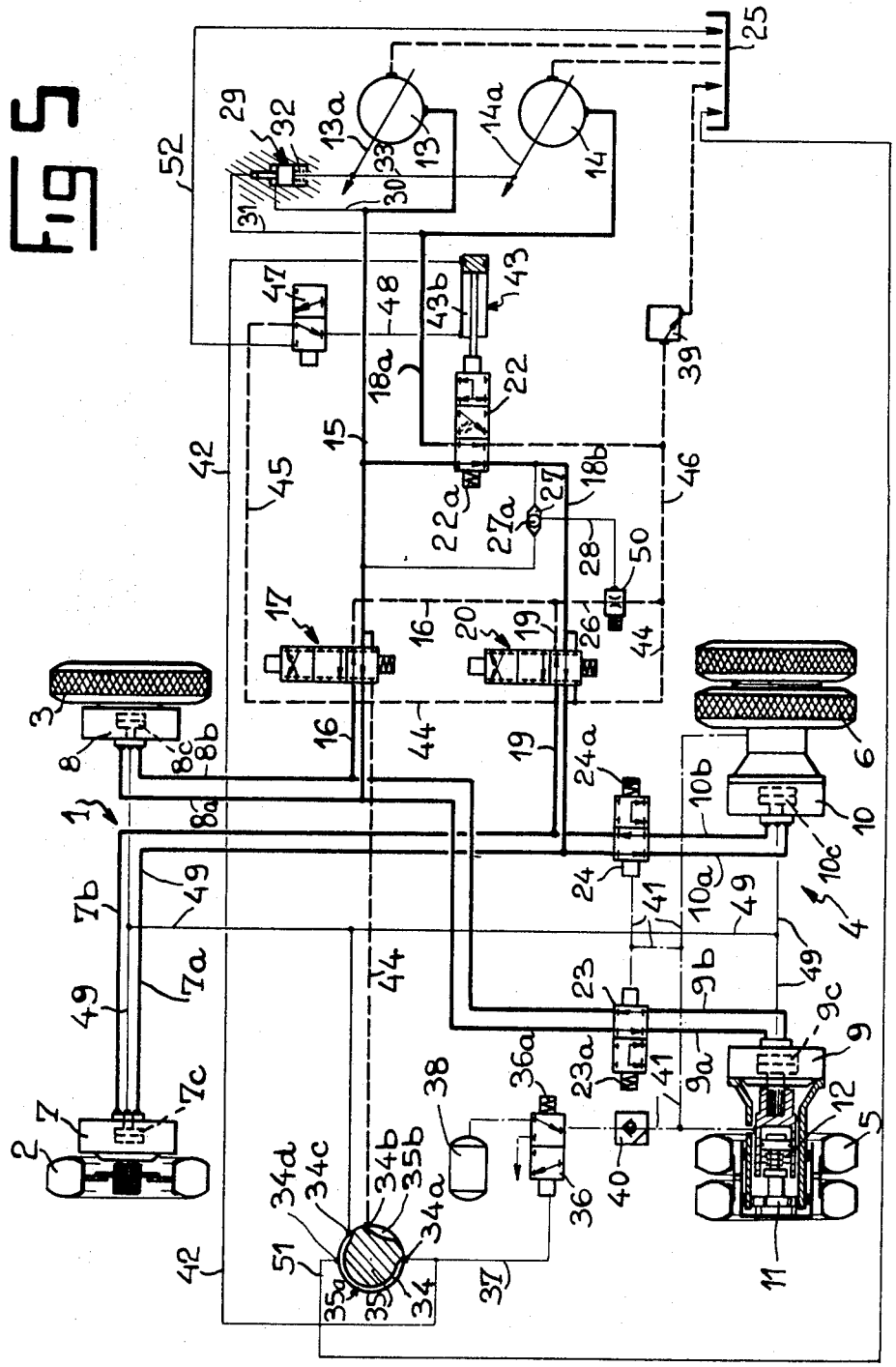

POWER TRANSMISSION

In some vehicles, more particularly building, civil engineering and handling equipment, it is of course advantageous to use a hydraulic power transmission to drive the wheels on the front or rear axles, many variations being possible. Thanks to the flexibility of hydraulics, it is possible more particularly to arrange for a wide range of speeds and in a relatively simple manner to provide the required speed changes.

However, another useful feature is to be able to use on set of equipment both to propel the vehicle and to operate a tool thereof, such as an actuator for lifting a shovel or tilting a skip or any other operation. Each of the simultaneous functions must be independent of the other and have its own safeguard, for instance, a limitation of the speed of the movements.

Problems arise of course due to the differential effect of the wheels on one side of the vehicle running at instantaneous speeds differing from the instantaneous speeds of the wheels on the opposite side of the vehicle. These problems are difficult to solve in conventional transmissions and usually require for their solution the provision of mechanical devices or complex hydraulic systems.

This invention provides fresh improvements to obviate the disadvantages of the prior art transmissions and to develop the same.

The invention relates to a hydraulic power transmission for a vehicle, more particularly building or civil engineering equipment, comprising two hydraulic pumps and two sets of wheels, each wheel having a hydraulic motor, each set comprising a front wheel and a back wheel, the hydraulic motors of the wheels of any one set being supplied in parallel by one of the pumps, wherein at least two wheels of each set are disposed on two opposite sides of the vehicle.

The invention will be better understood, and secondary features and their advantages will become apparent, from the following exemplary description of an embodiment of the invention, in the event the use of the invention in a two-axle four-wheel single-tool vehicle, each wheel being driven by a hydraulic motor having two predetermined different cylinder capacities, such values being selectable.

Motors of this kind are known and have been described in detail, inter alia in the applicants' French Pat. specifications Nos. 1,411,046 and 1,411,047, filed on June 3, 1964; similarly, the hydraulic speed limiter to be discussed hereinafter is known and has been described, inter alia in the applicants' French Pat. specification No. 1,463,911 filed on Oct. 13, 1965.

The description and drawings are of course given only as an example and explanation and are not limitative; the invention is therefore of use for other kinds of vehicle having variable-cylinder-capacity motors in one or more other relationships.

Reference will now be made to the accompanying drawings wherein:

FIG. 3 is a general diagrammatic view of the hydraulic circuit in a third position;

FIG. 5 is an overall diagrammatic view of the hydraulic circuit in a fifth position.

Figure 1:
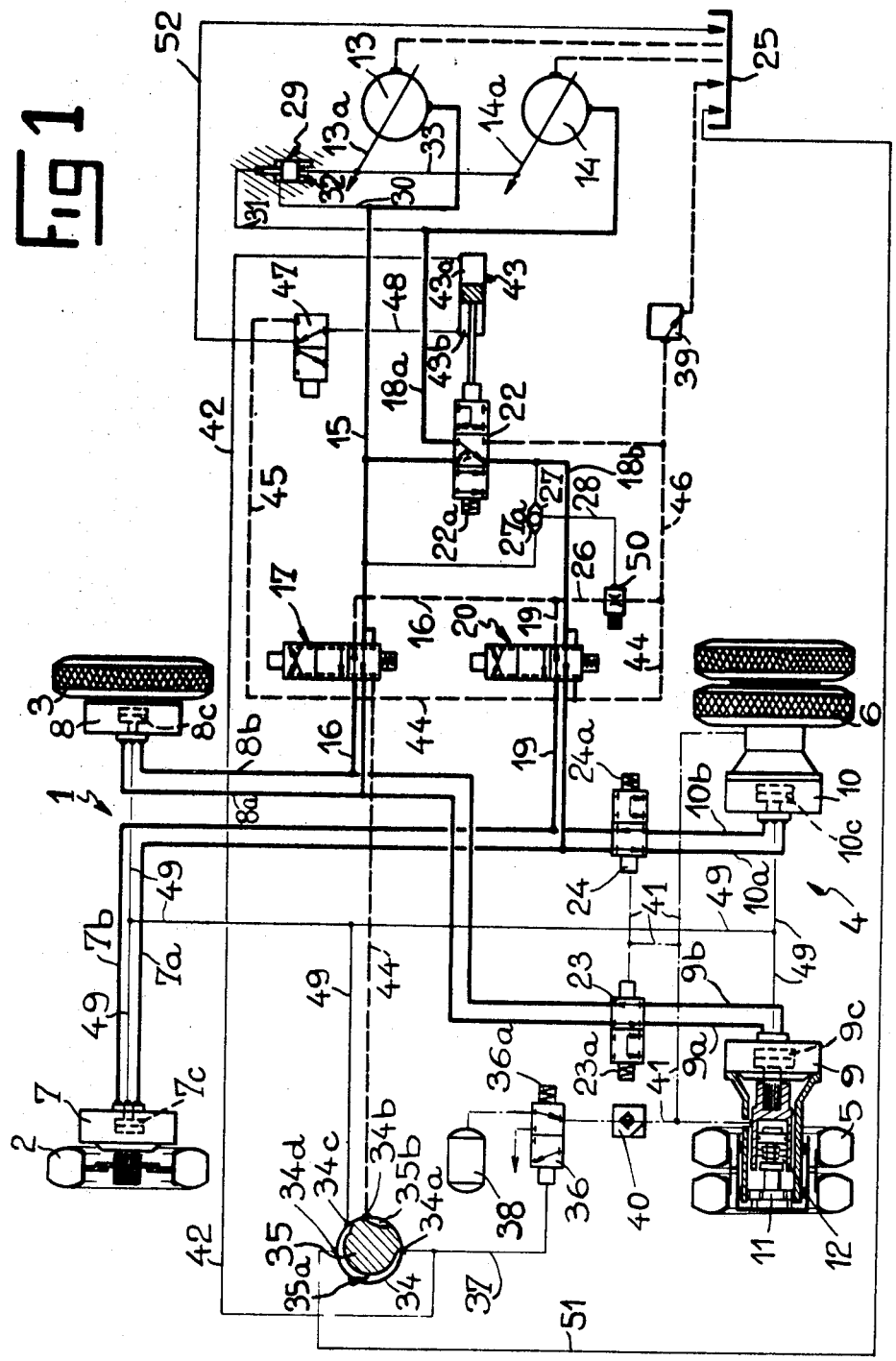
FIG. 1 is an overall diagrammatic view of a hydraulic circuit of a vehicle having a system according to the invention.

A vehicle having a hydraulic circuit of the kind shown in FIG. 1 has a front axle 1 having two front steerable wheels 2, 3 and a rear axle 4 having four twin wheels 5, 6. The four wheel units can be driven by individual hydraulic motors 7, 8 (front wheels) and 9, 10 (back wheels), all such motors being identical and having two different cylinder capacities. To this end, each engine has a cylinder-capacity selector 7c, 8c, 9c, 10c enabling either capacity to be used as required. As already stated, a detailed description of the motors and cylinder-capacity selectors is given in the aforesaid French Patent specifications and will not be repeated here; it will merely be pointed out that by way of example there is a 2:1 ratio between the cylinder capacities.

It will also be assumed that the rear axle 4 is required to bear three times the loading of the front axle 1, so that to make full use of adhesion the rear motors 9, 10 are required to produce three times the torque produced by the front motors 7, 8. This is achieved by a known technique through the agency of a speed reducer interposed between a wheel and the corresponding motor. A reducer 11 of this kind is shown in section at the wheel 5 and provides a 3:1 reduction ratio. A multiplate clutch 12 is provided between reducer 11 and motor 9. A description of this kind of clutch has already been given, inter alia in French Patent specification No. 1,463,911 (FIG. 6), and its operation and principles have been described. The wheel 6 is of course fitted out in just the same way as the wheel 5.

So that the front and rear wheels rotate at the same speed, the effect of the speed reducers, as 11, must be compensated for by a faster drive of the motors 9, 10. Accordingly, the delivery of each pump is distributed with an automatic adjustment so that, when the rear wheel motors are energized, the deliveries of the front and rear motors of any one set are in the same ratio as the speed reduction; in the example considered the delivery of the rear motors is three times the delivery of the front motors.

A first supply pump 13 is allotted to the motor set formed by the front right-hand motor 8 and the rear left-hand motor 9 and delivers via a duct 15 and reversing distributor 17 having three positions, corresponding to no supply, forwards and reverse. The motors 8, 9 are connected to distributor 17 by two ducts 8a, 9b and 9a, 9b which can be respectively and selectively connected to the supply duct 15 and to a return duct 16, the latter being connected to sump 25 via a discharge valve 39. The pressure thereof is low relatively to the delivery pressure of pump 13 being, for instance, of the order of 10 kgp/cm.² if the pump pressure is around 300 kgp/cm.².

Similarly, a second pump 14 supplies the front left-hand motor 7 and rear right-hand motor 10, delivering via a duct 18a, 18b and a distributor 20 which, like the distributor 17, has three positions corresponding to no supply, forwards and reverse. The motors 7, 10 are connected to distributor 20 by two ducts 7a, 7b and 10a, 10b which can be respectively and selectively connected to the supply duct 18a, 18b and to the return duct 19, the latter being connected to discharge valve 39 and therethrough to the sump 25.

The main supply ducts 15 and 18a, 18b are also both connected to three-position distributor 22. In a first position the same connects pump 14 to duct 18a, 18b and to the set formed by the motors 7, 10 and connects pump 13 to duct 15 and to the set of motors 8, 9 (this is the state shown in FIG. 1). In a second position, visible in FIG. 3, the distributor 22 connects pump 14 to ducts 15, 18b, the pump 13 already delivering to the duct 18b. When the distributor 22 is in the second position, the motors 9, 10 are isolated through the agency of a facility to be described hereinafter. When in a third position, shown in FIG. 5, distributor 22 connects pump 13 via ducts 15, 18b to the two sets of motors, which are therefore energized in parallel. In this latter case the pump 14 delivers to the duct 18a and the pressure fluid issues from the distributor 22 and is available for any purposes required other than vehicle propulsion.

As just stated, when the distributor 22 is in its second position, an appropriate facility isolates the motors 9, 10. The ducts 9a, 9b, 10a, 10b comprise two-position distributors 23, 24. When in a first position such distributors allow fluid to flow towards and/or from the motors 9, 10, this position corresponding to the first and third positions of the distributor 22. When in the second position the distributors 23, 24 cut the ducts 9a, 9b, 10a, 10b into two parts, so that the motors 9, 10 are isolated from their supply. This position corresponds to the second position of the distributor 22.

A speed limiter 50 similar to the one described in the aforesaid French Pat. specification No. 1,463,911 (see more particularly FIG. 5 thereof) is disposed on the return duct after the junction where the ducts 16, 19 from the distributors 17, 20 have merged to become a single duct 26. Actually, in the system according to this invention the limiter 50 is piloted, via a shuttle valve 27, by whichever is the greater if the two supply pressures in the ducts 15, 18b.

A pressure-summating device 29 controls the pump deliveries. The pressure fluid delivered by the two pumps goes through ducts 30, 31 to the two chambers of the device or controller 29; the effects of the two pressures are additive against the bias of an opposing spring 32. Consequently, a piston which is inside the controller 29 and which is connected to linkage 33 having connected to it in parallel the delivery control elements 13a, 14a of the two pumps, controls such deliveries to equality in dependence upon the required power. The greater the sum of the pressures, and therefore the greater the forces, the lower are the deliveries and vice versa.

Operation of the vehicle is therefore as follows:

It will first be assumed that the distributors 17, 20 are in the top position (FIG. 1) corresponding e.g. to forwards travel. Since the distributor 22 is also in the position shown, the fluid delivered by the pumps 13, 14 goes to the motors 8, 9 and 7, 10 forming each set. The clutches 12 are in the engaged position and the capacity selectors 7c, 8c, 9c, 10c are in the position corresponding to the higher capacity. This first phase of operation corresponds to the slowest speed with the tool not in use.

A second vehicle speed is obtained by changing the cylinder capacity of the motors through the agency of the capacity selectors, the operation of which will be described in detail hereinafter. The tool is still inoperative (see FIG. 2). In the particular example chosen, the second speed is twice the first speed.

A third speed, with the tool inoperative, is obtained by simultaneous operation of the distributor 22, which is moved to the left-hand position, against the action of the return spring 22a (see FIG. 3), and of the capacity selectors 7c, 8c, which are brought to the higher capacity position, and of the distributors 23, 24, which are brought to the position corresponding to isolation of the rear motors, and of the clutches 12, which are released. The facilities for producing this simultaneous actuation will be described hereinafter. During this third phase the two pumps 13, 14 deliver in parallel to the parallel-connected front motors 7, 8, the rear motors 9, 10 being disconnected from their wheels 4, 5. The total delivery to the motors 7, 8, bearing in mind the 3:1 reduction ratio used for the rear wheels, is four times the delivery received in the first phase. Consequently, vehicle speed in the third phase is four times what it is in the first phase.

Figure 4:
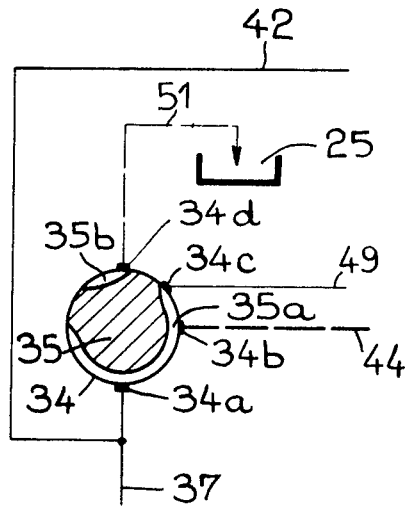
FIG. 4 is a diagrammatic detail view of the distributor of FIG. 3 in a fourth position.

To obtain a fourth speed with the tool inoperative, the selectors 7c, 8c are, with the vehicle in third speed, moved to the smaller capacity position, with the result, in the particular example under consideration, that fourth speed is twice third speed and therefore eight times first speed (see FIG. 4).

The tool can be brought to the operating position, to which end the distributor 22 is moved to its extreme right-hand position against the return spring 22a (see FIG. 5). The pump 14 is isolated and ready to operate an actuator, whereas the pump 13 delivers to the two sets of circuits of the motors 8, 9 and 7, 10. Vehicle speed is therefore half first speed, when each set is supplied by on pump and the selectors are in the high-capacity position.

Of course, this speed range, covering a ratio of ½ to 8, is further increased by the action of the device associating the force with the speed; when the force is small, there may be a slight increase in speed.

As will be apparent, the vehicle-propelling circuits are completely independent from the tool-operating circuits, a definite advantage for uniform operation.

Of course, the same number of speeds, but in reverse, can be obtained by downwards operation of the distributors 17, 20, the intermediate position corresponding to "stop." These operations, which are coupled together for the distributors 17, 20, are performed manually.

Since the procedure and construction for the hydraulic speed limiter have been disclosed in the aforesaid French Patent specification, a detailed description of its operation will not be given here; however, something will be said about the function of a new element—a shuttle valve 27. The pressure fluid from the two supply ducts 15, 18b arrives at the two inlets of valve 27 and whichever fluid is at the higher pressure pushes the inner ball 27a to block the arrival of the other fluid, only the higher pressure fluid going through the outlet duct 28 to the speed limiter 50.

The special advantages of the invention can be seen more clearly, inter alia the possibility of using only a single speed limiter. Also, even if any circuit experiences a serious disturbance with abrupt pressure drops (actuator emptying), the limiter still continues to operate satisfactorily precisely because it is piloted by the higher of the supply pressures and therefore by the fluid of the circuit in which the delivery varies least.

A description will now be given with reference to FIG. 1 of the elements for controlling the cylinder-capacity selectors, the rear wheel clutches, the distributor 22 and the distributors 23, 24. This circuit mainly comprises a manually controlled distributor having a cylindrical casing 34, rotatably mounted in which is a pivot 35 formed with two grooves 35a, 35b adapted to interconnect two or more orifices 34a, 34b, 34c, 34d in the casing 34. Accordingly, pivot 35 can take up four different positions.

The clutches are constructed and operate similarly to the clutches disclosed in French Pat. specification No. 1,463,911 and have been described therein. The novelty is that they are controlled not by electrovalve but by hydraulic circuit. When the hydraulic pressure in the duct 37 connecting casing 34 to distributor 36 is zero because of the pivot 35 being in a particular position (for instance, as in FIGS. 1 or 2 or 5), communication is established between a fluid pressure reservoir 38, for instance, of compressed air, and the ducts 41 via the two-position distributor 36 and the valve 40 which forms a fast-escape valve. The absence of upstream pressure pilots the opening of valve 40 to give a discharge of pressure fluid. The ducts 41 connect the valve 40 to the two rear clutches and to the two distributors 23, 24. When the fluid flowing through them is pressurized, the clutches which are in the inoperative unclutched position come to the clutched position, while the distributors 23, 24 are in the position for the supply to the rear motors 9, 10 of the energizing oil from the pumps. On the other hand, when with the pivot 35 in some other position (see FIGS. 3 and 4) the duct 37 is filled with pressure fluid (oil), such fluid operates the distributor 36 against the force of the return spring 36a and thus interrupts communication between reservoir 38 and ducts 41. The clutches are left in the inoperative—i.e., declutched—position, and the return springs 23a, 24a return the distributors 23, 24 to the position in which they isolate the rear motors 9, 10 from the pumps. Also, in this latter position the ducts 41 are rapidly connected to atmosphere via valve 40.

As will also be apparent, orifice 34a is connected via duct 42 to chamber 43a of actuator 43 of distributor 24, orifice 34b communicates via ducts 44, 46 and valve 39 with reservoir 25 and, via ducts 44, 45, with the two-position distributor 47 in turn connected via duct 48 to chamber 43b of actuate 43, orifice 34c is connected via ducts 49 to the four motors of the wheels and orifice 34d is connected to sump 25 via duct 51.

The first position of pivot 35 can be seen in FIG. 1. The three orifices 34a, 34c, 34d are connected to sump 25. The rear wheel clutches are therefore engaged, being supplied with compressed air from reservoir 38, and the rear wheels are driven, being energized with pressure oil via the appropriately positioned distributors 23, 24. The front right wheel and rear left wheel are driven by pump 13 and the front left wheel and rear right wheel are driven by pump 14 at low speed, the capacity selectors being in the high-capacity position since the orifice 34c communicates with sump 25.

Figure 2:
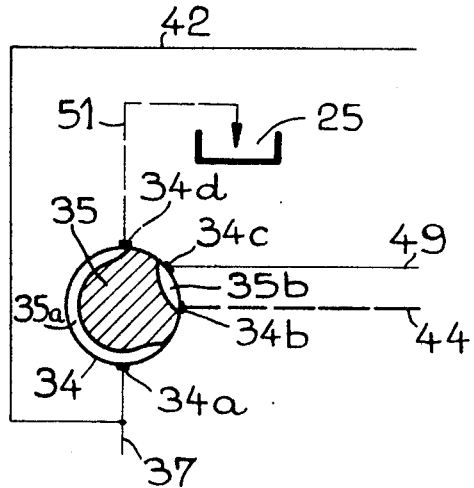
FIG. 2 is a separate diagrammatic view showing the distributor of FIG. 1 in a second position.

In the second position of pivot 35, visible in FIG. 2, the only difference is that the orifice 34c is not connected to sump 25. The pressure oil reaching groove 35b via ducts 44 goes through duct 49 to the capacity selectors to "engage" the lower capacity and thus change the vehicle over to its second speed of propulsion.

The third position of pivot 35 is shown in FIG. 3 and connects to reservoir 25 the duct 49, via groove 35b, the orifice 34d and the duct 51. Consequently, the capacity selectors "engage" the higher value capacity of each motor. Also, the pressure oil reaches groove 35a through duct 44 and goes through duct 37 to force distributor 37 against its spring and interrupt the compressed air supply to the ducts 41. The clutches are therefore left inoperative (declutched) and the rear motors are isolated from the oil supply by the distributors 23, 24 which their springs 23a, 24a move into the supply interrupting position. The two pumps deliver via the distributors 17, 20, 22 to the parallel-connected front wheel motors which are on high capacity. This is third speed.

The fourth position of pivot 35, shown in FIG. 4, differs from the third only in that orifice 34c is connected to groove 35a. The pressure oil operates the capacity selectors via the ducts 49 to select the lower capacity of each motor and, more particularly, of the front motors which drive the vehicle in fourth speed.

The fifth position provides propulsion of the vehicle with simultaneous operation of the tool. The pivot 35 is in exactly the same position as the first position already described but for the first time the distributor 47 is placed manually in its second position. The pressure oil flows through ducts 44, 45 to reach the inlet of 47, goes through 47 and 48 to chamber 43b of 43, simultaneously as 43a is connected to sump 25 via duct 42, groove 35a, orifice 34d and duct 51. In the first position of 47 the opposite occurs and more particularly chamber 43b is connected via 48, 47 and duct 52 to sump 25. In the present case actuator 43 moves distributor 22 to its third position, in which pump 14 is isolated and reserved for operation of the tool, while pump 13 delivers via distributor 22 to supply in parallel the two motor sets—i.e., the four motors. The speed of travel is therefore half the first speed.

When a steering movement is made, the wheels on one side of the vehicle require a different energization to the wheels on the other side, and therefore different pumps are required for each side. However, the system hereinbefore described, which is of the crossed circuits kind, obviates this disadvantage, so that deliveries remain equal for the pumps supplying the two circuits in first and second speeds and more particularly in the special case in which the tool operates.

The transmission according to the invention is of course of use for vehicles having more than two axles provided that at least two wheels of each wheel set are disposed on two opposite sides of the vehicle so as to benefit from the advantage of crossed circuits.

The invention is not limited to the embodiment hereinbefore described but covers any possible variants which do not depart from the scope of the invention. More particularly, one or more different methods of operation can be envisaged, such as the case in which pivot 35 is in the position shown in FIG. 2, the tool operating. Consequently, the motors run on the lower cylinder capacity, so that vehicle speed can be equal to the first speed but with the tool in use. Also, instead of motors having two cylinder capacities being used, motors can be used which can have either a number of cylinder capacity increments or a steplessly variable cylinder capacity.

I claim:

1. A drive system for a vehicle having first and second sets of wheels, each set of wheels including a front wheel disposed on one side of said vehicle and a rear wheel disposed on the opposite of said vehicle, comprising a fluid drive motor operatively connected to each of said wheels, first and second fluid pressure sources, a first fluid supply means operatively interconnecting said first fluid pressure source and the fluid drive motors of said first set of wheels, a second fluid supply means operatively interconnecting said second fluid pressure source and the fluid drive motors of said second set of wheels, and means operatively connected to said fluid supply means for selectively communicating said first fluid pressure source with the fluid drive motors of said first set of wheels while simultaneously communicating said second fluid pressure source with the fluid drive motors of said second set of wheels, communicating said first and second fluid pressure sources to the fluid drive motors of said first and second sets of wheels, and communicating said first fluid pressure source exclusively with the fluid drive motors of said first and second sets of wheels whereby said second fluid pressure source would be available to operate a fluid operated tool.

2. A drive system for a vehicle according to claim 1 wherein each of said fluid supply means includes means for selectively preventing the supply of fluid under pressure to one of said fluid drive motors operatively connected thereto.

3. A drive system for a vehicle according to claim 2 wherein said means for selectively preventing the supply of fluid under pressure is operable to prevent the supply of fluid under pressure to both of the fluid motors connected to the fluid supply means.

4. A drive system for a vehicle according to claim 1 including gear reduction means operatively interconnecting each of said fluid drive motors and a wheel.

5. A drive system for a vehicle according to claim 1 wherein said means for selectively communicating said fluid pressure sources with said fluid motors includes a first valve disposed in said first fluid means for selectively supplying fluid under pressure to the fluid drive motors of said first set of wheels in opposite directions to produce forward and reverse drive, a second valve disposed in said second fluid supply for selectively supplying fluid under pressure from said second fluid pressure source to the fluid drive motors of said second set of wheels in opposite directions to produce forward and reverse drive, and a third valve disposed in said second fluid supply means between said second fluid pressure source and said second valve, and operatively connected to said first fluid supply means between said first fluid pressure source and said first valve, for selectively communicating said second fluid source with said second valve, said first and second fluid pressure source with said second valve, and said first fluid pressure source with said second valve.

6. A drive system for a vehicle according to claim 5 wherein each of said fluid supply means includes means for selectively preventing the supply of fluid under pressure to one of said fluid drive motors operatively connected thereto.

7. A drive system for a vehicle according to claim 6 wherein said means for selectively preventing the supply of fluid under pressure is operable to prevent the supply of fluid under pressure to both of the fluid drive motors connected to said fluid supply means.

8. A drive system for a vehicle according to claim 5 including gear reduction means operatively interconnecting each of said fluid motors and a wheel.